(12) United States Patent
Sagardoyburu

(10) Patent No.: US 9,529,337 B2
(45) Date of Patent: Dec. 27, 2016

(54) WATCH EQUIPPED WITH A MAGNIFIER

(71) Applicant: The Swatch Group Research and Development Ltd, Marin (CH)

(72) Inventor: Michel Sagardoyburu, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/046,856

(22) Filed: Feb. 18, 2016

(65) Prior Publication Data
US 2016/0246263 A1    Aug. 25, 2016

(30) Foreign Application Priority Data
Feb. 24, 2015 (EP) .................................... 15156307

(51) Int. Cl.
*G04B 39/02* (2006.01)
*G04G 9/00* (2006.01)
(Continued)

(52) U.S. Cl.
CPC *G04G 9/00* (2013.01); *G02B 3/14* (2013.01); *G04B 19/283* (2013.01); *G04B 39/008* (2013.01); *G04B 39/002* (2013.01)

(58) Field of Classification Search
CPC ....... G02B 3/14; G04B 39/008; G04B 39/004; G04B 19/283; G04B 39/002
See application file for complete search history.

(56) References Cited

U.S. PATENT DOCUMENTS 2,679,785 A * 6/1954 Batt ..................... G04B 39/008
                                                            359/441
4,964,093 A * 10/1990 Hiranuma .......... G04B 37/0025
                                                            368/283
(Continued)

FOREIGN PATENT DOCUMENTS

CH           368756      12/1962
EP        0 693 718 A1    1/1996
(Continued)

OTHER PUBLICATIONS

European Search report issued Nov. 5, 2015 in European Application 15156307, filed on Feb. 24, 2015 ( with English Translation).

*Primary Examiner* — Sean Kayes
(74) *Attorney, Agent, or Firm* — Oblon, McClelland, Maier & Neustadt, L.L.P.

(57) ABSTRACT

The watch comprises a case in which a watch movement is housed, this case being provided with a watch glass supporting a liquid zoom lens for visually magnifying, momentarily, one element of the watch movement which is visible through the watch glass. The liquid lens is formed by an elastic membrane and a first part of a reservoir comprising a transparent liquid. It is switchable between a non-magnifying state where the elastic membrane is substantially planar and a magnifying state where this elastic membrane is curved in response to pressure exerted on the transparent liquid. The watch comprises, in addition, an actuator, provided in order to vary the pressure of the transparent liquid by driving into an elastic wall of a second part of the reservoir, and means for controlling the actuator which can, in one variant, be activated by a user.

12 Claims, 4 Drawing Sheets

(51) Int. Cl.
*G04B 19/28* (2006.01)
*G02B 3/14* (2006.01)
*G04B 39/00* (2006.01)

(56) References Cited

U.S. PATENT DOCUMENTS

| | | | | |
|---|---|---|---|---|
| 5,065,373 | A * | 11/1991 | Alcantara Maia | G04B 47/00 368/10 |
| 5,566,137 | A | 10/1996 | Chevroulet et al. | |
| 6,456,569 | B1 * | 9/2002 | Stauffer | G04B 19/06 368/236 |
| 6,816,438 | B1 * | 11/2004 | Zeller | G04B 37/0033 359/809 |
| 2002/0051075 | A1 * | 5/2002 | Yamaguchi | H04N 5/2254 348/376 |
| 2006/0062090 | A1 | 3/2006 | Ast et al. | |
| 2006/0250897 | A1 * | 11/2006 | Brewer | G02B 6/06 368/82 |
| 2011/0051254 | A1 | 3/2011 | Lee et al. | |
| 2015/0138454 | A1 * | 5/2015 | Pugh | A61F 2/1627 349/13 |

FOREIGN PATENT DOCUMENTS

| | | |
|---|---|---|
| EP | 2 295 498 A1 | 3/2011 |
| JP | 62-265586 | 11/1987 |
| JP | 5-88004 | 4/1993 |
| JP | 11-2701 | 1/1999 |
| JP | 2011-141438 | 7/2011 |

\* cited by examiner

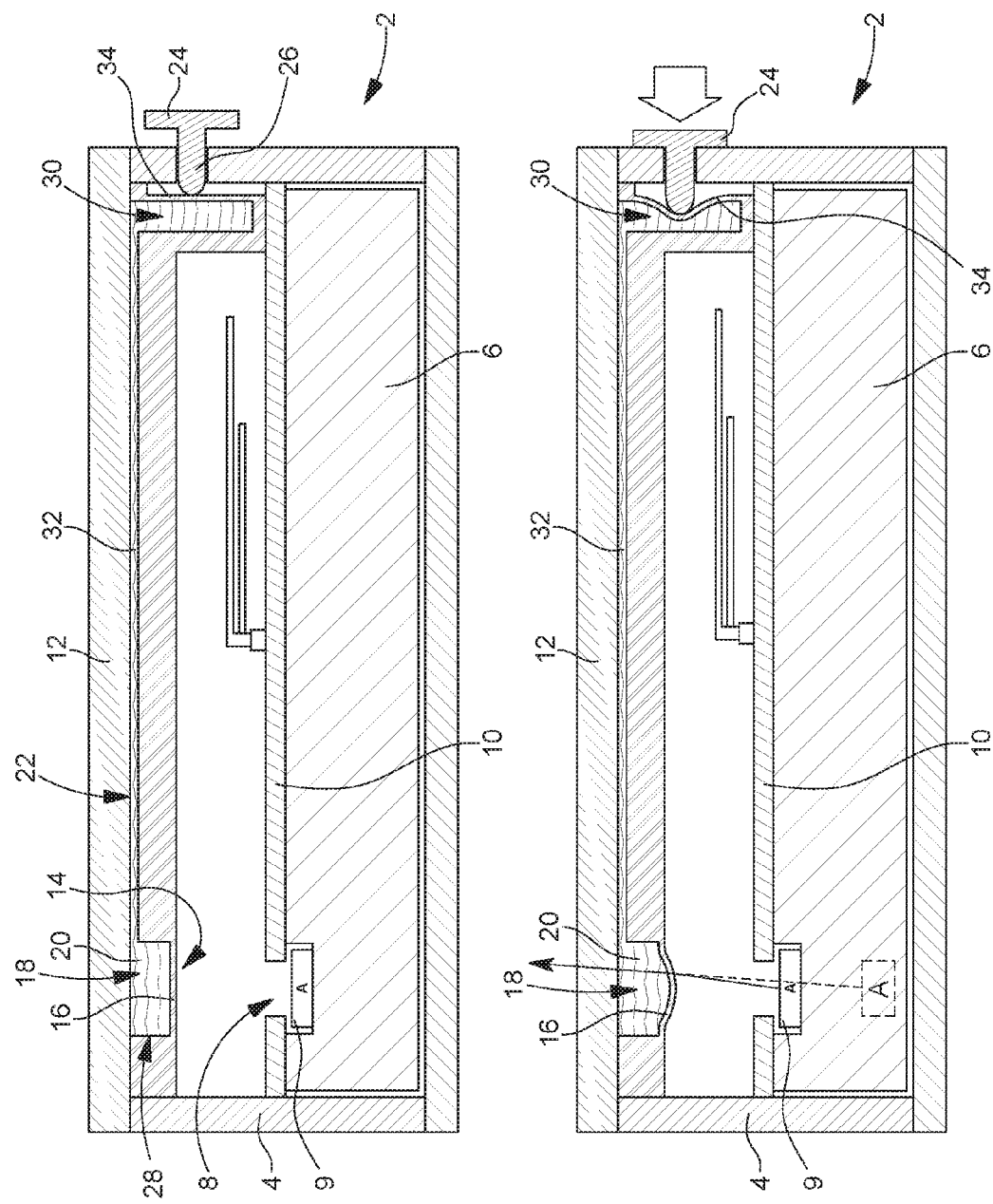

WATCH EQUIPPED WITH A MAGNIFIER

This application claims priority from European Patent Application No. 15156307.9 filed on Feb. 24, 2015, the entire disclosure of which is hereby incorporated herein by reference.

TECHNICAL FIELD

The present invention relates to the field of watches having a magnifier provided at the level of a watch glass in order to magnify an analogue display of any data, in particular calendar data, in order to facilitate reading thereof or in order to magnify one element or one part of the watch movement or of the dial.

TECHNOLOGICAL BACKGROUND

Watches equipped with a magnifier at the level of their glass in order to magnify the display of the day of the month have been known for a long time. According to a first variant, the magnifier is machined into the watch glass. In another variant, a magnifying lens is glued under the interior face of the glass.

Such a magnifier is valued by users because the size of the window and the imprint of the day of the month are often of very small dimensions, in particular when the days of the month are imprinted on a single ring or disc. However, some consumers consider that a magnifier impairs the beauty of the watch and therefore poses an aesthetic problem. In fact, a magnifier often gives the watch a retro look. Moreover, it causes optical deformation of the dial when viewed from a distance or obliquely.

In order to remedy this problem, watchmakers have proposed watches with a "large date", also termed watches with a "large window", with reference to the window provided in the dial in order to display the day of the month. Such a solution makes the watch movement more complex and therefore increases the production costs thereof. Furthermore, a large window occupies more space on the dial and the associated mechanism is often relatively cumbersome at the level of the bottom plate of the watch movement so that this solution limits the possibilities for arranging other information. Finally, some embodiments place the tens and the units of the day of the month on different levels, which is generally visible.

SUMMARY OF THE INVENTION

The aim of the present invention is to resolve the problems of the prior art explained above.

To this end, the subject of the present invention is a watch comprising a case provided with a watch glass and a watch movement housed in this case, the watch glass supporting an optical magnifying device provided for visually magnifying, at least momentarily, at least one element of the watch movement which is visible through this watch glass. The optical magnifying device comprises a liquid zoom lens, which is formed by an elastic membrane which defines a lower wall of a first part of a reservoir comprising a transparent liquid. The elastic membrane is provided under the watch glass and the first part of the reservoir is situated between this elastic membrane and this watch glass. The liquid lens is switchable between a non-magnifying state in which the elastic membrane is substantially planar and at least one magnifying state in which this elastic membrane has a curved profile. In addition, the watch comprises an actuator, provided in order to vary the pressure of the transparent liquid in the reservoir, and means for controlling the actuator. This actuator and the control means thereof are provided in order to be able to vary the focal length of the liquid lens and in particular to switch this liquid lens between the non-magnifying state and the magnifying state.

The novel application of a liquid zoom lens in order to form a magnifier for reading any data, in particular of a calendar, in a watch or in order to allow an enlarged view of one element of a watch movement which is visible through the watch glass meets the problems of prior art in an elegant fashion. In fact, when the user wishes to know for example the day of the month, it suffices for him to actuate the control means connected to the actuator in order that a magnifier is formed momentarily by the liquid lens and magnifies the day of the month. Once reading has been effected, the liquid lens can return to a state in which the elastic membrane thereof is substantially planar. In this latter inactive state, there is no magnifying effect so that the liquid lens becomes barely visible, and even quasi-invisible according to a preferred embodiment of the invention.

Other particular features of the invention will be explained hereafter in the detailed description of the invention.

BRIEF DESCRIPTION OF THE DRAWINGS

The invention will be described hereafter with the help of attached drawings, given by way of example and in no way limiting, in which:

FIG. 1 shows, schematically in section, a first variant of a first embodiment of a watch according to the invention, with the liquid lens in a non-magnifying state;

FIG. 2 is a view similar to that of FIG. 1 with the liquid lens in a magnifying state;

DETAILED DESCRIPTION OF THE INVENTION

Figure 3:
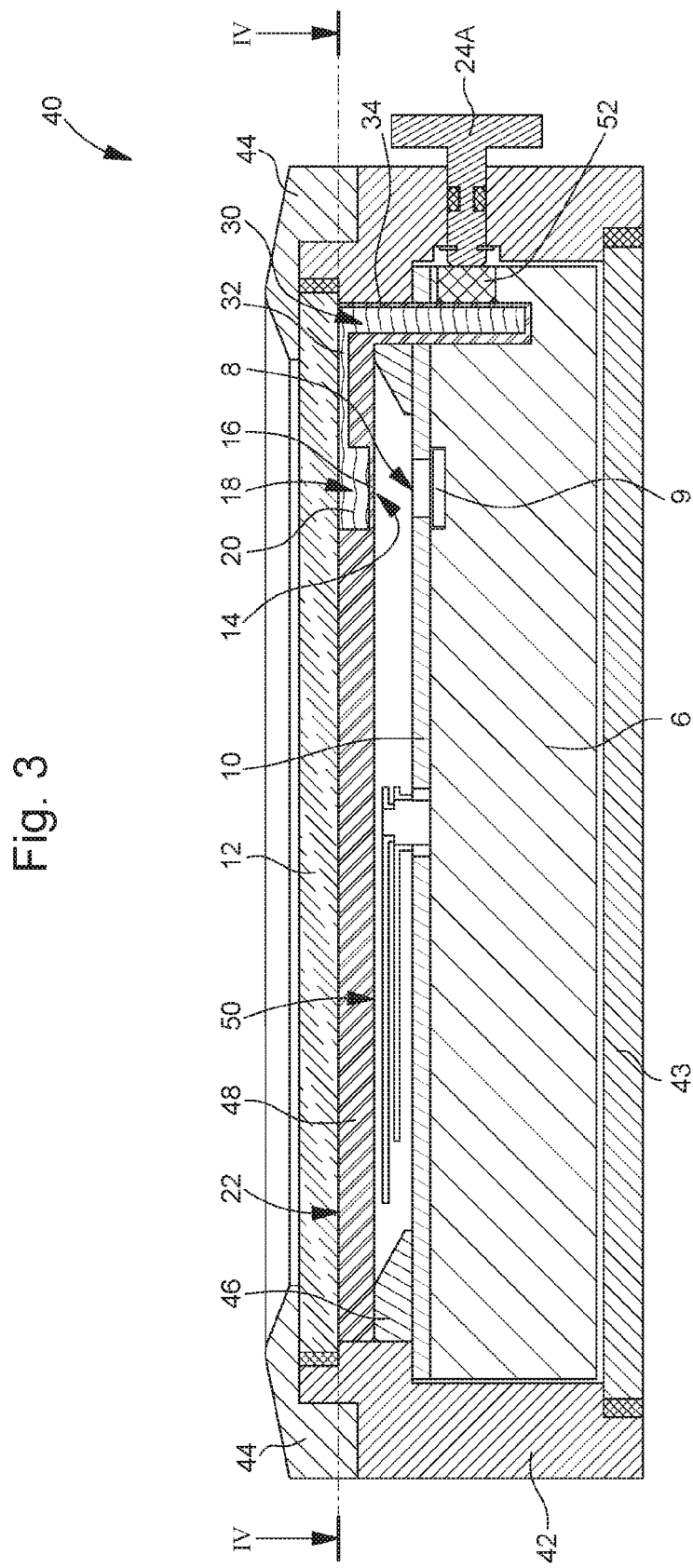
FIG. 3 shows, in section, a second more improved variant of the first embodiment, with the liquid lens in a non-magnifying state.

With the help of FIGS. 1 and 2, a first variant of a first embodiment of a watch according to the invention will hereafter be described, this first variant being represented schematically. The watch 2 comprises a case 4 in which a watch movement 6 with an analogue display 8 of calendar data is housed (denoted "A" in the sectional plane in order to indicate in the Figures the effect of the invention, but in reality these calendar data are imprinted on the upper surface of the ring 9 and are visible through the window in the dial 10). This case comprises a watch glass 12 arranged above this analogue display. According to the invention, this watch comprises a liquid zoom lens 14 which is disposed, according to a particular variant, perpendicular to the analogue display 8. This liquid lens makes it possible to form, intermittently and on demand, an optical magnifying lens in order to read the calendar data. To this end, the liquid lens is formed by an elastic membrane 16 which defines a lower wall of a first part 18 of a reservoir in which a transparent liquid 20 is situated. The liquid lens is arranged below the watch glass, the elastic membrane being at a spacing from the interior face 22 of this glass and the first part of the reservoir extending between the elastic membrane and this glass.

In order to switch the liquid lens between a non-magnifying state (FIG. 1) in which the elastic membrane 16 is substantially planar and a magnifying state (FIG. 2) where this elastic membrane is curved in response to pressure exerted on the transparent liquid, the watch comprises in addition a push-button 24 which jointly defines an actuator and means for controlling this actuator. In general, the actuator is provided in order to vary the pressure of the transparent liquid, and the control means can be activated by a user of the watch. In the schematic variant represented in FIGS. 1 and 2, the actuator and the control means are therefore formed by a single push-button which is actuatable mechanically from outside the case by a user. In other variants, the actuator and the control means are separate. In the case of a mechanical watch movement, the actuator and the control means are preferably of the mechanical type. Conversely, with an electronic movement, a variant can be designed where the control means are of the electronic type and the actuator is then activated electrically, for example by a piezoelectric motor. In general, the control means can be external, as described above, or internal (for example a predetermined state of the watch movement).

In an improved embodiment, an anticollision system of the hands for analogue display of the watch is provided. In a first variant, a mechanism preventing activation of the liquid lens is provided if the hands are under this liquid lens or near to the latter. In a second variant when there is a risk of collision of the hands during activation of the optical lens, a mechanism is provided which momentarily displaces the position of the hand or hands of relevance before placing the liquid lens in its magnifying state. The hand or hands thus displaced are brought back into its/their correct position once the liquid lens is again in its non-magnifying state.

By "elastic membrane", there is understood a membrane which significantly deforms elastically, for example under the action of a force lightly exerted by a finger of a user on a piston pressing on the transparent liquid. In one variant, the elastic membrane is selected such that it is able to deform so as to form substantially a hemisphere (for example with a radius of three to four millimetres) under the action of such a force over a distance of one to two millimetres.

According to a particular feature, the first part 18 of the reservoir has a lateral wall 28 which is formed of the same material as the elastic membrane and consists of a single piece with this elastic membrane. The lateral wall 28 preferably has a thickness greater than the thickness of the elastic membrane. By thickness of the lateral wall, there is understood the dimension parallel to the glass 12 because it is this dimension which ensures rigidity of the lateral wall. Arrangement of the first part of the reservoir is provided so that a variation in liquid pressure 20 essentially only deforms the membrane 16.

According to another particular feature, the reservoir comprises a second part 30 provided on the internal periphery of the case 4. The first part and the second part of the reservoir are connected by a channel 32 which is provided at least partially under the watch glass and parallel to the latter, this channel having at least one wall which is formed of the same material as the elastic membrane and consists of a single piece with this elastic membrane.

According to other particular features, the second part of the reservoir is provided under a peripheral zone of the watch glass and the channel is entirely provided under the watch glass. The channel has a wall formed by the watch glass, covered or not with an intermediate layer, and the other walls thereof are formed of the same material as the elastic membrane and consists of a single piece with this elastic membrane. The second part of the reservoir is likewise formed of the same material as the elastic membrane and consists of a single piece with this elastic membrane.

According to another particular feature, the second part 30 of the reservoir has an elastically deformable wall 34, also termed elastic wall, and the push-button 24 comprises a pressure element 26 provided opposite this elastically deformable wall so as to be able to exert a variable pressure on this elastic wall.

According to another particular feature, the elastic membrane 16 is formed by an elastomer, in particular polydimethylsiloxane (PDMS). The refractive index of this material is equal to approx. 1.4. In a preferred variant, the refractive index of the transparent liquid is substantially identical to that of the elastomeric structure. In a first example, the transparent liquid comprises approx. 60% glycerol and 40% water. In a second example, the transparent liquid comprises approx. 73.5% ethylene glycol and 26.5% ethanol. Other mixtures can be produced from high-index and low-index liquids, these liquids being able to be selected so as to adjust likewise other parameters, in particular the viscosity.

In a preferred variant, the elastic membrane, the two parts of the reservoir and the channel which connects them are formed by one and the same elastomeric structure and by the watch glass. It is provided that only the elastic membrane 16 of the first part 18 of the reservoir and the elastic wall 34 of the second part 30 of this reservoir substantially deform when the actuator is activated in order to increase the pressure of the transparent liquid 20. This elastomeric part can be obtained with the help of a mould. Once the elastomer is polymerised, the upper surface of the part, intended to be glued against the interior face 22 of the glass, is preferably subjected to an oxygen plasma treatment. Such a treatment is likewise effected on the interior face of the glass. Then, the elastomeric structure is glued against the interior face 22 and the reservoir thus formed is filled with a transparent liquid. Once the opening for introduction of the liquid is sealed, a liquid zoom lens is obtained. Preferably, with the exception of the second part of the reservoir, the elastomeric part defines a layer of a constant thickness, i.e. the distance between the interior face (22) of the watch glass and the lower surface (50) of this layer is substantially constant. In a preferred variant, the elastomeric layer extends under the entirety of the visible surface of the watch glass.

With the help of FIGS. 3 and 4, a second variant of the first embodiment, described previously, will be described, this second variant being more improved than the first variant thanks to some additional features which will be explained hereafter. The elements already described above will not be described again in detail.

The watch 40 comprises a case which is formed, as standard, from a middle part 42, a base 43 and a bezel 44. The transparent liquid reservoir 20 comprises a first part 18 which forms the liquid lens 14 and a second part 30 which is provided under a peripheral zone of the watch glass. The liquid zoom lens with its reservoir and the channel 32 connecting the first and second parts 18 and 30 of this reservoir are formed by one and the same elastomeric structure 48 glued on the interior face 22 of the watch glass 12.

This second variant is aesthetically advantageous as a result of the fact that the second part 30 of the reservoir is situated under the bezel 44 of the watch 40 and at least partially behind a raised part 46 provided between the watch glass 12 and the dial 10 so that this second part is essentially not visible through the watch glass.

According to a preferred feature, the first part 18 of the reservoir and the elastic membrane 16, forming the liquid lens opposite the display of the day of the month 8, are formed in an elastomeric layer of the structure 48, this layer extending under the entirety of the visible surface of the watch glass 12 and having a planar surface on the opposite side to the interior face 22 of this watch glass. Furthermore, at least the part of the channel 32 situated under the visible surface of the glass 12 is provided in this layer. As the watch glass here has an interior planar face, the elastomeric layer and the transparent liquid 20 situated in the first part 18 of the reservoir and in the channel 32 have a constant thickness under the visible surface of the watch glass. In other words, it is provided that the distance between the interior face of the glass and the lower surface 50 of the structure 48 is substantially constant under the entirety of the visible surface of the watch glass. In the case of a curved glass, the elastomeric layer then has a lower surface and an upper surface which are parallel and curved. Furthermore, in an advantageous variant, the transparent liquid has a refractive index substantially identical to that of the elastomer. In the case where the liquid lens 14 is in its non-magnifying state (FIG. 3), the presence of this lens is invisible for the user of the watch. Thus, this lens becomes visible only when the user actuates the control means (in the represented example, the push-button 24A) in order to curve the elastic membrane 16 and to obtain magnification of the day of the month (magnifying state of the liquid lens).

In this second variant, the watch 40 comprises an actuator 52, provided in order to vary the pressure of the transparent liquid, and control means 24A connected to the actuator and being able to be activated by a user of the watch. The second part 30 of the reservoir has an elastic wall 34 and the actuator is formed by a pressure element provided opposite this elastic wall.

Figure 4:
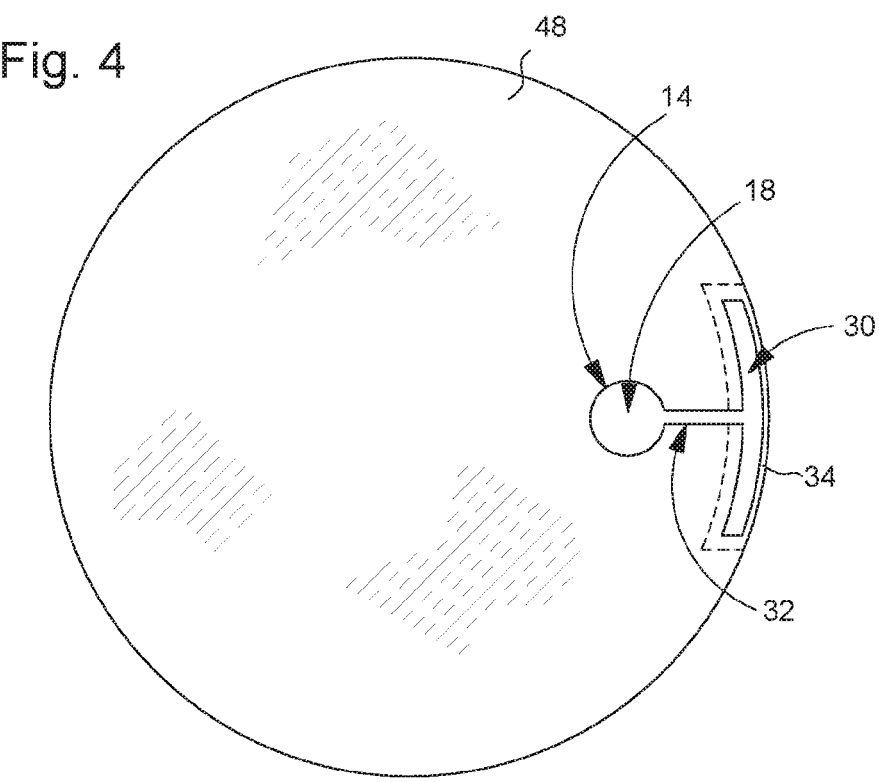
FIG. 4 is a view from above of an elastomeric structure forming the liquid lens of the watch of FIG. 3, this view corresponding to a section along the line IV-IV of this FIG. 3.
Figure 5:
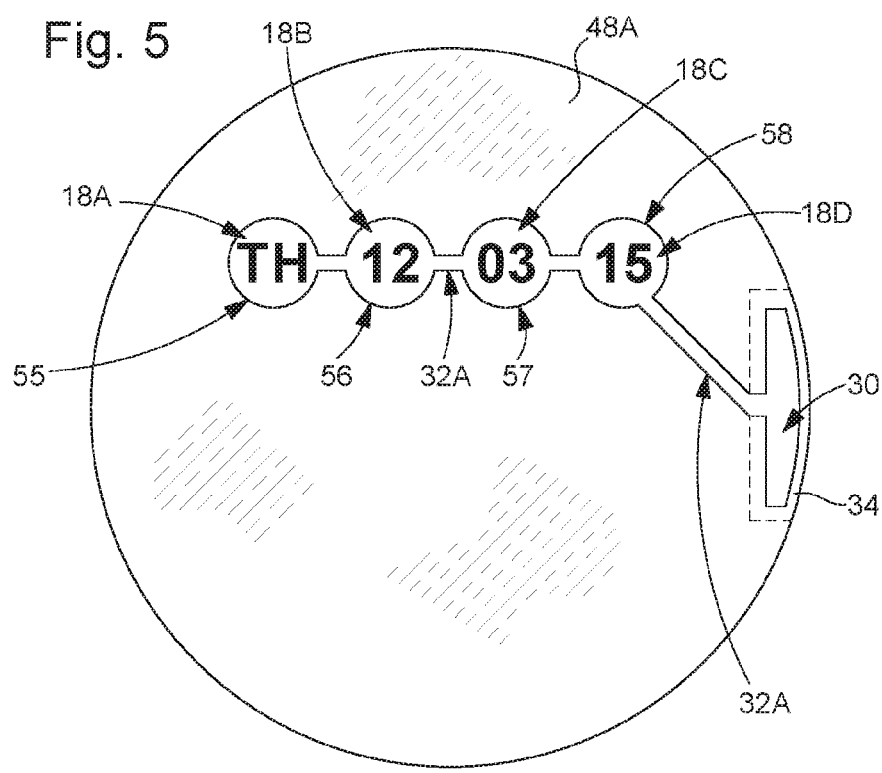
FIG. 5 is a view from above, similar to that of FIG. 4, of a variant of the elastomeric structure defining a plurality of liquid lenses.

In FIG. 5, there is shown schematically, along a section similar to that of FIG. 4, an elastomeric structure 48A according to an embodiment variant in which a plurality of liquid lenses 55, 56, 57 and 58 is provided, each formed by a separate first part 18A respectively 18B, 18C & 18D of the reservoir, as described previously. These first parts of the reservoir are all connected to the second part 30 thereof, on the elastic wall 34 of which an actuator acts. The liquid lenses can be, as represented, connected to each other by a channel 32A which also connects these liquid lenses to the second part of the reservoir. In another variant, each liquid lens can be connected to this second part of the reservoir its own channel. Thus, the focal length of the liquid lenses is varied simultaneously. In the example represented in FIG. 5, four liquid lenses are provided in order to magnify four calendar items of information, i.e. the day of the week, the day of the month, the month and the year.

According to a particular embodiment, the watch movement 6 is a mechanical movement. The push-button 24A is mechanically actuatable from outside the case by the user and connected to the actuator so that the pressure element presses on the elastic wall 34 and deforms it when pressure is exerted on the push-button. It will be noted that the form and positioning of the second part of the reservoir can be different in different variants and that the actuator can be more complex than the one represented in FIG. 3. In particular, this actuator can be formed from a plurality of parts with a terminal part defining the pressure element.

Figure 6:
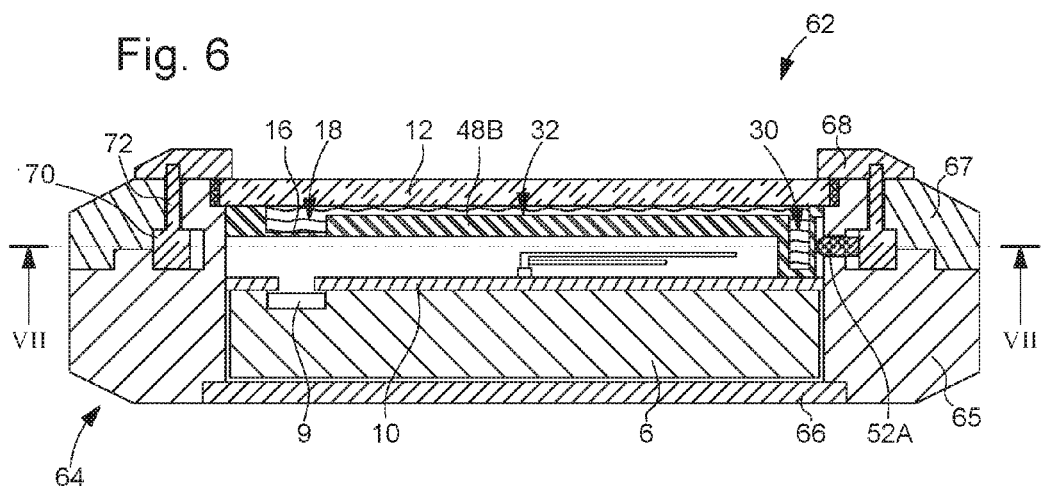
FIG. 6 shows, in transverse section, a second embodiment of a watch according to the invention.
Figure 7:
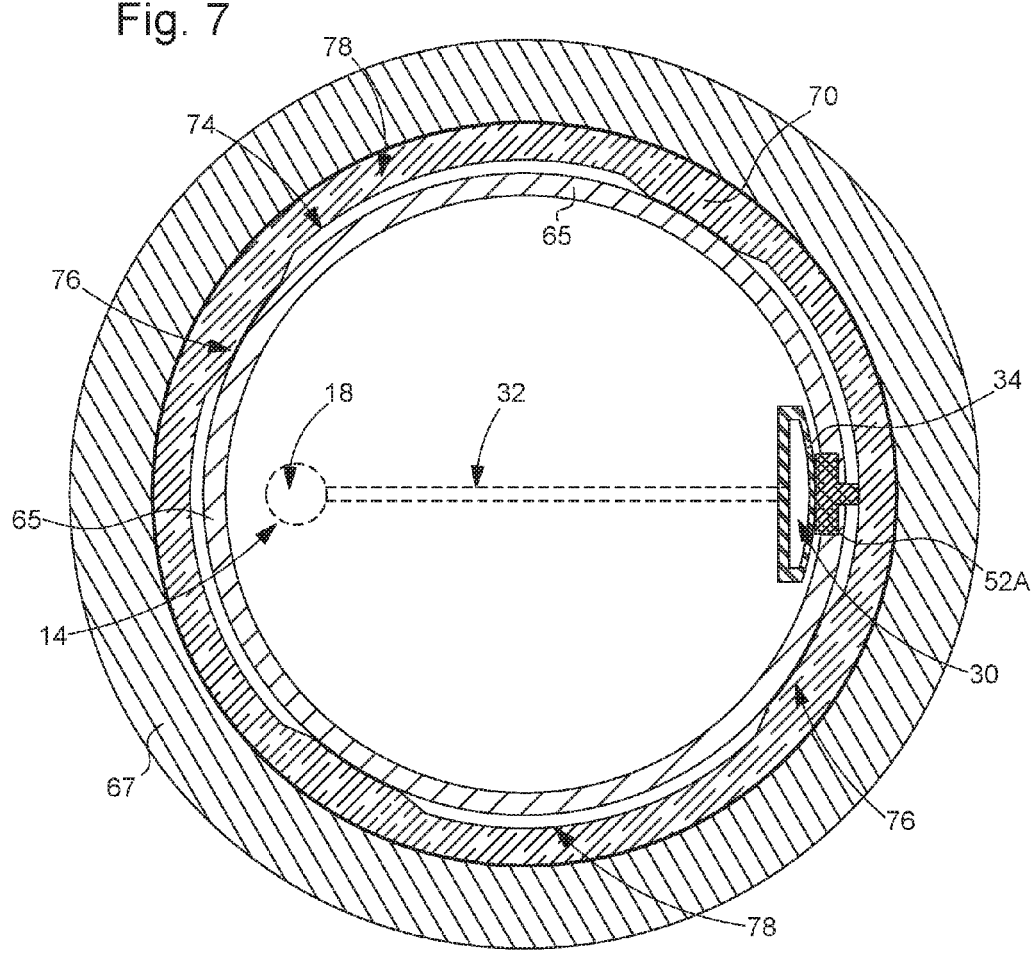
FIG. 7 is a horizontal section of the watch of FIG. 6 along the line VII-VII of this FIG. 6.

In FIGS. 6 and 7, a second embodiment of a watch 62 according to the invention is represented schematically. This watch comprises a case 64 formed from a middle part 65 supporting the watch glass 12, a base 66 and a fixed bezel 67. The references already described previously will not be described here again. This second embodiment differs from the first embodiment essentially by the arrangement of the control means of the actuator. The actuator 52A is formed by a piston situated opposite an elastic wall 34 of the second part 30 of the transparent liquid reservoir, as described previously. The control means of this actuator are formed by a rotating crown 68 connected to a circular cam 70 by pins or an annular ring 72. The interior profile 74 of the cam 70 defines at least one projecting part 76 provided in order to actuate the piston 52A in the direction of the second part 30 of the reservoir so as to drive the head of this piston into the elastic wall 34 and thus to increase the pressure of the transparent liquid in order to obtain the desired magnification via the liquid lens 14. The circular cam thus has at least one projecting part (in the example represented in FIG. 7, there are four of them) which makes it possible to put the liquid lens in a magnifying state when this projecting part is positioned opposite the actuator 52A and at least one circular part 78 situated set back from this projecting part and leaving the liquid lens in a non-magnifying state when this circular part is positioned opposite the actuator. Preferably, the radius of the circular part 78 is selected such that the piston 52A has a radial position corresponding to a pressure in the reservoir for which the elastic membrane 16 of the liquid lens 14 is planar, i.e. not deformed. By actuating in rotation the rotating bezel 68, a user can thus make the liquid lens 14 move from a magnifying state (active state) to a non-magnifying state (inactive state).

In general, the rotating bezel is connected to at least one cam provided in order to activate the liquid lens for at least one first angular position of this rotating bezel and to leave this liquid lens inactive for at least one second angular position different from the first angular position. It will be noted that embodiment variants and also other control means can be envisaged by the person skilled in the art. For example, the rotating bezel can be provided only between two angular positions, for example 60° apart, these two positions corresponding respectively to an active state and an inactive state of the liquid lens. In another variant, it can be provided that the cam presses directly on the elastic wall of the transparent liquid reservoir. It will be noted again that the rotating bezel can be used furthermore for activation of other functions of the watch.

In the embodiment variants of the invention described above, the liquid lens forms a magnifier in order to magnify momentarily the display of the day of the month visible through a window of the dial or more generally calendar data. This is only one particular application of the invention. In fact, the liquid lens can be used in order to magnify intermittently any information of an analogue display, in particular by disc or by hand, or a digital display. It is thus possible to magnify the information of a small dial with the help of a plurality of liquid lenses connected to each other by a channel. In other particular applications, the liquid lens serves to magnify momentarily a signature of the watch movement, a brand, an element or a part of this movement, in particular a mechanism, a resonator, an escapement, a stone, an engraving etc.

Finally, a watch according to the invention can comprise a plurality of independent liquid lenses, i.e. each with its own reservoir. A single actuator or a plurality of actuators respectively can be provided. Likewise, a plurality of control means can be provided (for example a plurality of push-buttons) or one and the same control means (for example a rotating bezel provided in order to vary in succession the pressure of the transparent liquid in the various reservoirs and possibly in order to activate a plurality of liquid lenses simultaneously in one given angular position).

What is claimed is:

1. Watch comprising a case provided with a watch glass and a watch movement housed in this case, the watch glass supporting an optical magnifying device provided for visually magnifying, at least momentarily, at least one element of the watch movement which is visible through this watch glass, wherein the optical magnifying device comprises at least one liquid zoom lens, this liquid lens being formed by an elastic membrane which defines a lower wall of a first part of a reservoir comprising a transparent liquid, the elastic membrane being provided under said watch glass and the first part of the reservoir being situated between this elastic membrane and this watch glass; wherein the liquid lens is switchable between a non-magnifying state in which the elastic membrane is substantially planar and at least one magnifying state in which this elastic membrane has a curved profile; and wherein the watch comprises in addition an actuator, provided in order to vary the pressure of the transparent liquid in the reservoir, and means for controlling the actuator, this actuator and the control means thereof being provided in order to be able to vary the focal length of the liquid lens and in particular to switch this liquid lens between said non-magnifying state and said magnifying state.

2. Watch according to claim 1, wherein said element of the watch movement forms an analogue display, said liquid zoom lens being disposed perpendicular to this element of said analogue display.

3. Watch according to claim 1, in which said liquid zoom lens is a first liquid lens, wherein said optical magnifying device comprises furthermore at least one second liquid zoom lens formed similarly to the first liquid lens and connected to said reservoir so that a variation in pressure of said transparent liquid by said actuator causes a variation in the focal length of this second lens.

4. Watch according to claim 1, wherein said first part of the reservoir has a lateral wall which is formed of the same material as said elastic membrane and consists of a single piece with this elastic membrane.

5. Watch according to claim 4, wherein the reservoir comprises a second part provided under a peripheral zone of said watch glass; and wherein the first part and the second part of said reservoir are connected by a channel which is provided at least partially under the watch glass parallel to the latter, this channel having at least one wall which is formed of the same material as said elastic membrane and consists of a single piece with this elastic membrane.

6. Watch according to claim 5, wherein the second part of the reservoir is likewise formed of the same material as said elastic membrane and consists of a single piece with this elastic membrane; wherein this second part has an elastic wall; and wherein said actuator comprises a pressure element provided opposite the elastic wall so as to be able to exert a variable pressure on this elastic wall.

7. Watch according to claim 5, wherein the second part of said reservoir is situated under a bezel of this watch and at least partially behind a raised part provided between the watch glass and a dial so that this second part is essentially not visible through the watch glass.

8. Watch according to claim 1, wherein said first part of said reservoir and said elastic membrane are formed in an elastomeric layer which extends under the entirety of the visible surface of the watch glass, the distance between the interior face of the watch glass and the lower surface of this layer being substantially constant under the entirety of the visible surface of the watch glass.

9. Watch according to claim 8, wherein said transparent liquid has a refractive index substantially identical to that of the elastomer.

10. Watch according to claim 1, wherein said watch movement is a mechanical movement, and wherein said control means are formed by a control element which is actuatable mechanically from outside the case by a user.

11. Watch according to claim 10, wherein said control element is a push-button.

12. Watch according to claim 10, wherein said control element is a rotating bezel connected to at least one cam provided in order to activate said liquid lens for at least one first angular position of this rotating bezel and to leave this liquid lens inactive for at least one second angular position different from the first angular position.

* * * * *